Jan. 16, 1951  E. E. SIVACEK  2,538,432
WINDSHIELD WIPER MECHANISM
Filed Sept. 13, 1947  2 Sheets-Sheet 1
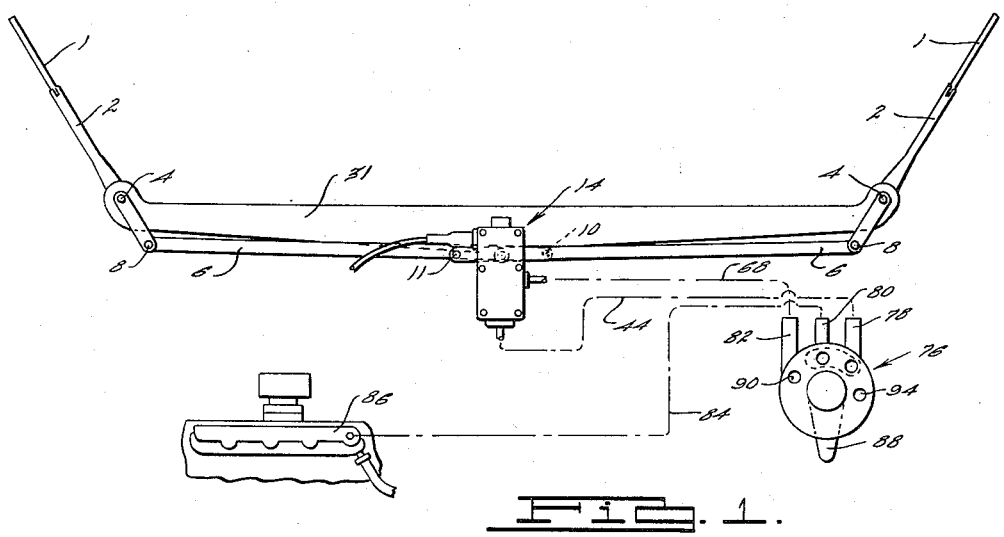
Fig. 1.
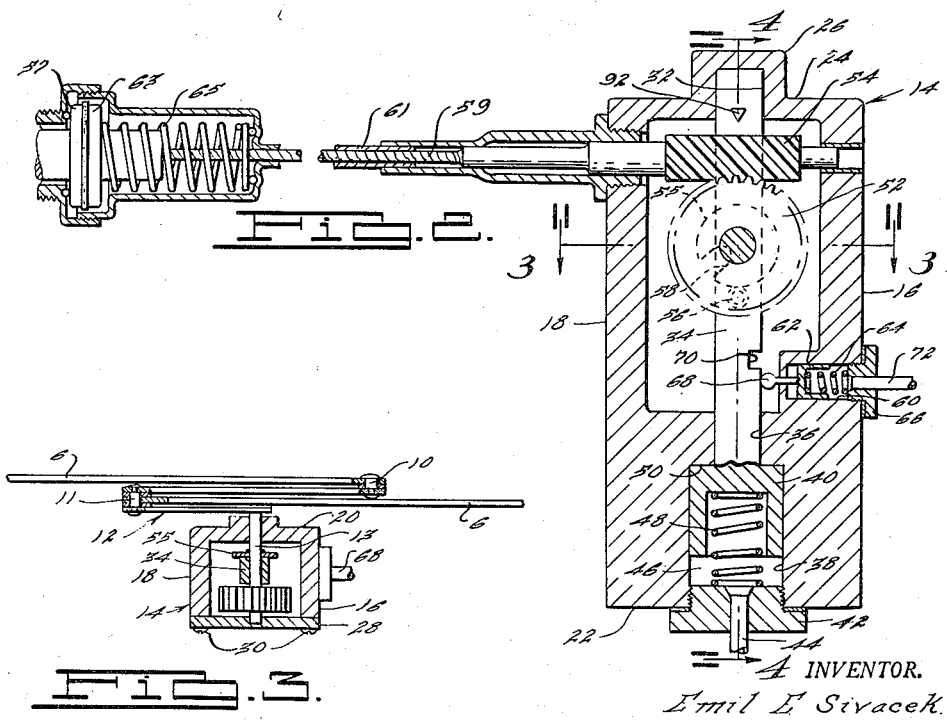
Fig. 2.
Fig. 3.
INVENTOR.
Emil E. Sivacek
BY
Harness, Dickey & Pierce
ATTORNEYS.

Jan. 16, 1951 E. E. SIVACEK 2,538,432
WINDSHIELD WIPER MECHANISM
Filed Sept. 13, 1947 2 Sheets-Sheet 2
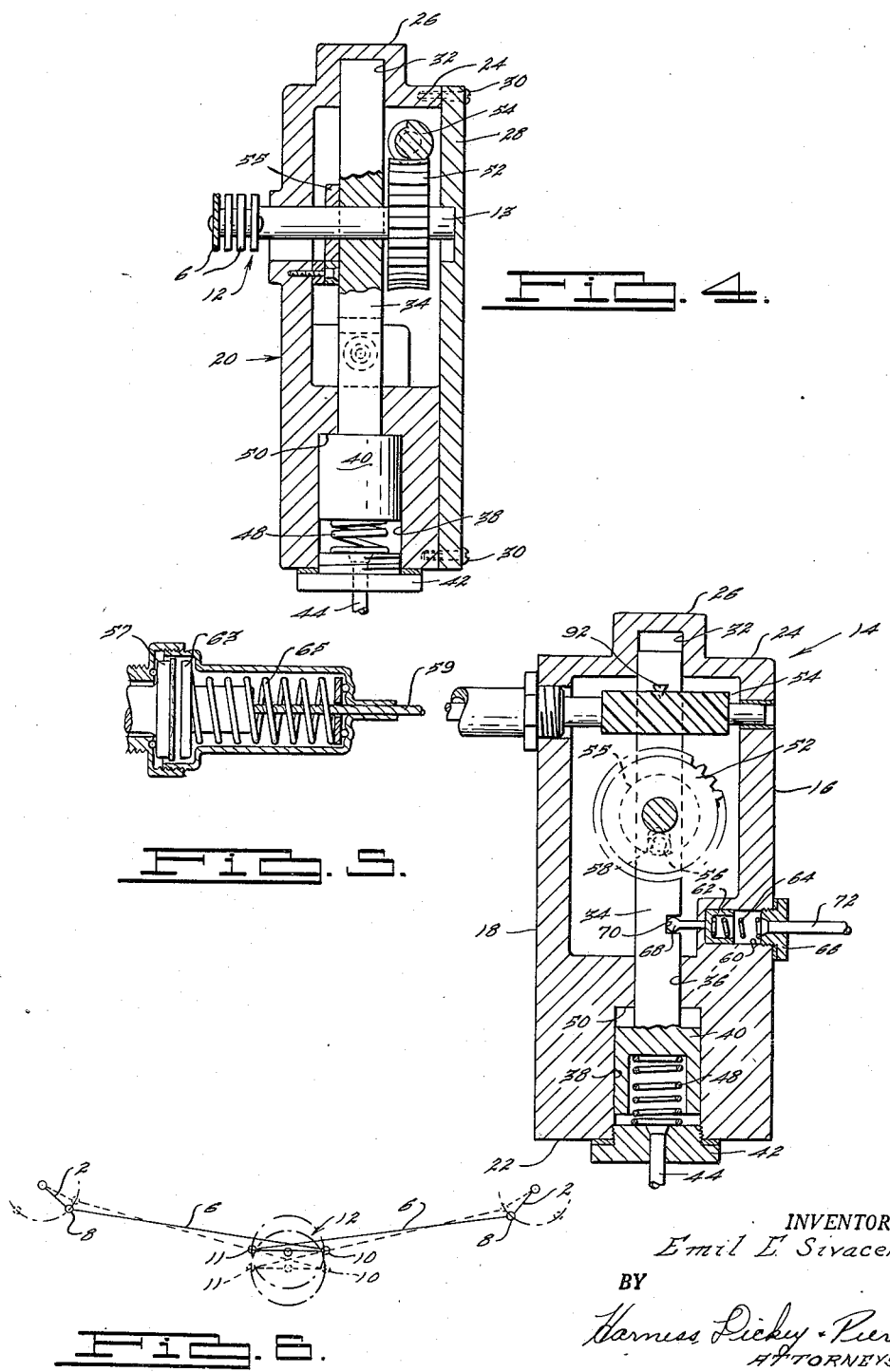
INVENTOR.
Emil E. Sivacek.
BY
Harness, Dickey & Pierce
ATTORNEYS.

Patented Jan. 16, 1951

2,538,432

UNITED STATES PATENT OFFICE 2,538,432

WINDSHIELD WIPER MECHANISM

Emil E. Sivacek, Ann Arbor, Mich., assignor to King-Seeley Corporation, Ann Arbor, Mich., a corporation of Michigan Application September 13, 1947, Serial No. 773,812

24 Claims. (Cl. 74—70)

The present invention relates to windshield wiper mechanism and particularly relates to controls for such mechanism whereby the windshield wiper blades may be parked in a predetermined position.

This application is an improvement on my co-pending application, Serial No. 768,985, filed August 16, 1947, for Windshield Wiper Mechanism.

One of the primary objects of the present invention is to provide an improved means for parking mechanically driven windshield wiper blades.

Another object of the invention is to provide such a means for parking the blades in a position which is beyond the normal oscillating range of the wiper blade.

Another object is to provide such a mechanism which is easily and economically manufactured which has a minimum of mechanical parts and which will provide long trouble free service.

Other objects of this invention will become apparent from the following specification, the drawings relating thereto, and from the claims hereinafter set forth.

In the drawings in which like numerals are used throughout to designate like parts in the several views:

Figure 1 is a partially diagrammatic view showing a windshield wiping mechanism embodying the invention;

Fig. 2 is an enlarged view in central vertical section showing a portion of the mechanism of Fig. 1 in running position;

Fig. 3 is a view taken substantially along the line 3—3 of Fig. 2 and looking in the direction of the arrows;

Fig. 4 is a view taken substantially along the line 4—4 of Fig. 2 and looking in the direction of the arrows;

Fig. 5 is a view similar to Fig. 2 but showing the parts in a parked position; and Fig. 6 is a diagrammatic view showing the manner in which the blades are moved to a parked position beyond the normal range of movement of the wiper blades.

Although the present invention is specifically illustrated as being associated with windshield wipers and while it has particular utility when so used, it will be appreciated by those skilled in the art that in generic aspects it has other uses within the scope of the present invention in which the drawings are to be taken as illustrating rather than as limiting the invention which is to be limited only by the scope of the hereinafter appended claims.

Referring to the drawings, the numeral 1 designates generally a pair of wiper blades carried by the usual arms 2 in the usual pivots 4 adjacent the windshield of a motor vehicle or the like. The arm 2 and associated wiper blade 1 are rocked backwardly and forwardly over the windshield surface by means of a pair of links 6 pivotally secured as at 8 at one end portion thereof to the arms 2, the other end portions of the links 6 are secured to opposite crank throws 10 and 11 of a crank arm 12 carried by a rotatable shaft 13. A housing 14 substantially rectangular in shape has side walls 16 and 18, a rear wall 20, a bottom wall 22, which is of substantially greater thickness than the other walls, and a top wall 24 having an upwardly extending boss 26. The other or open wall of the casing 14 is closed by means of a cover plate 28 held thereon as by screws 30. The housing 14 is carried as shown by a member 31 which also carries the pivots 4. The upper end wall 24 is recessed concentrically with the upwardly extending boss 26 to provide a bearing 32 for a reciprocably mounted vertically extending shaft 34, the lower end of which extends through and is supported within a bearing aperture 36 in the lower end wall 22. The aperture 36 extends completely through the end wall 22 and its lower end portion is enlarged as at 38.

A piston member 40 has a piston fit within the aperture portion 38 and forms the lower end section of the rod 34. The outward end of the aperture portion 38 is closed by means of a cap nut 42 having a central aperture therethrough which receives a conduit member 44 communicating with the interior of the aperture portion 38 between the cap nut 42 and the piston member 40 into what will be hereinafter referred to as the piston chamber 46. A helical coil spring 48 located within the piston chamber 46 has its lower end resting against the cap nut 42 and its upper end abutting against the piston member 40 whereby the piston member 40 is normally urged upwardly into engagement with a shoulder 50 formed in the end wall 22 at the intersection of the bearing aperture 36 with the portion 38.

The shaft 13 is journaled for rotation in the shaft 34 and is arranged so that the longitudinal axis thereof extends substantially perpendicular to the longitudinal axis of the shaft 34. A worm gear 52 is suitably secured to the shaft 13 and is located intermediate the shaft 34 and the cover plate 28. A worm 54 is journaled for rotation in the walls 16 and 18 and when the shaft 34 is in its uppermost position its teeth are engageable with the teeth of the worm gear 52 whereby rotation of the form 54 is operable to rotate the stub shaft 13 and the crank throws 10 and 11 whereby the links 6 reciprocate the wiper blades 1 along the surface of the windshield. Power for rotating the worm 54 is obtained from any suitable source of rotating energy, as for example, a rotating part of the motor vehicle engine with which the wiper blades 1 are associated and may be of the type which is driven through a governor mechanism substantially as shown, described and claimed in my said copending application whereby the clutch element 57 will be driven at substantially constant speed irrespective of the speed of the vehicle engine. A longitudinally movable core 59 of a flexible drive cable 61 carries at one end a second clutch element 63 cooperable with the element 57 and is suitably secured at the other end to the worm 54. A clutch spring 65 located concentrically with the core 59 acts to urge the element 63 into driving relation with the element 57.

The shaft 34 and piston 40 are normally maintained in their upper position and are resiliently held against downward movement by the spring 48. A cam wheel 55 which is carried by and rotatable with the shaft 13 has a substantially circular cam surface which rides for the most part against a rotatable follower member 56 carried by the wall 20 of the casing 14 intermediate the shaft 34 and wall 20. The cam wheel 55 has a cut-away portion 58 which, once each revolution of the shaft 13, aligns with the cam follower 56, whereby the shaft 34 and its associated shaft 13 may move downwardly to disengage the worm wheel 52 from the worm 54 when the piston 40 is in its lowered position. This downward movement of the piston 40 is provided by providing a subatmospheric pressure within the piston chamber 46, as will be described below.

The wall 16 is apertured to provide an outwardly opening piston chamber 60 which receives a piston 62 normally urged inwardly by a helical coil spring 64 which seats at one end against the piston 62 and at the other end against a cap nut 66 which closes the open end of the chamber 60. The piston 62 carries a catch 68 which projects into the interior of the housing 14 and normally abuts the adjacent surface of the shaft 34. When, however, the shaft 34 is in its lowered position, the catch 68 moves into a shouldered slot 70 of the shaft 34 and holds the shaft 34 in its lowered position against upward movement by the piston 40 upon the return of atmospheric pressure to the chamber 46. A conduit 72 extends centrally through the nut 66 and is in open communication with the chamber 60. When it is desired to permit the shaft 34 to move upwardly whereby the worm wheel 52 may be rotated again by the worm 54, subatmospheric pressure is applied to the piston chamber 60 through the conduit 72 as will be described below. This subatmospheric pressure will cause the piston 62 to move outwardly against the force of the spring 64 whereby the catch 68 is moved out of holding relation with the slot 70. At the same time, atmospheric pressure is applied to the chamber 46 whereby the spring 48 moves the piston 40 and the shaft 34 upwardly engaging the teeth of the worm wheel 52 with the worm 54 whereby the shaft 13 is again rotated for reciprocation of the blades 1.

Control of the pressure within the piston chambers 46 and 60 is accomplished by means of a hand-actuated valve 76 having a series of ports 78, 80 and 82. The port 80 is connected by means of conduit 84 to the intake manifold 86 of the motor vehicle engine with which the windshield wiping mechanism is associated whereby subatmospheric pressure will be maintained at the port 80 during normal engine operation. With the control knob 88 of the valve 76 set in parked position, as shown, this subatmospheric pressure will be transmitted from the port 80 to the port 78, and therefrom through the conduit 44 which is in open communication with the port 78 to the chamber 46. The port 82 is connected by means of the conduit 72 to the pressure chamber 60, the port 82 being in communication with atmospheric pressure through port 90.

Assuming that the control knob 88 of the valve 76 has just been moved into the shown position and that the engine is operating and rotating the worm 54, the piston 62 will be in the position shown in Fig. 2 with the catch 68 in engagement with the adjacent surface of the shaft 34. As the worm 54 rotates the worm wheel 52 and the wiper blades 1, the circular surface of the cam wheel 55 rotates against the follower member 56 whereby the shaft 34 is held in its upper position until such time as the cut-away portion 58 thereof aligns itself with the follower member 56. At this time, the shaft 34 will move downwardly under control of its piston 62 so that the cut-away portion 58 encompasses the follower member 56, which movement locks the cam member 55 against rotation with the shaft 13 in a position to hold the wiper blades 1 at one limit of their stroke. As the shaft 34 moves downwardly, the shaft 13 moves along with it as does also the crank 12. This downward movement of the crank 12 increases the distance between the crank throws 10 and 11 and the one of the pivot points 8 with which their connected links are associated. Since the links 6 are of constant length, the blades 1 will be rotated into a parked position. The limit of this movement is when the pivot points 8 are in a substantially straight line position with respect to the crank throws, the pivot points 8 and the pivots 4.

A dog 92 is located on the shaft 34 in overlying relation to the worm 54 and at such a distance above the worm 54 that upon downward movement of the shaft 34 the dog 92 will engage the worm 54 just after the worm wheel 52 has disengaged from the worm 54. The shouldered slot 70 is positioned on the shaft 34 so that, upon movement of the shaft 34 to its lowermost position as determined by the engagement of the dog 92 with the worm 54, it aligns with the catch 68 for receiving the piston 62 which is moved inwardly under force of the spring 64 whereby the shaft 34 is latched in its lowered position with the worm wheel 52 disengaged from the worm 54 and the wiper blades 1 in their parked position. Should now the engine 86 be stopped so that the source of subatmospheric pressure is removed and atmospheric pressure again applied to the piston chamber 46, the spring 48 is ineffective to move the shaft 34 toward its upward position because of the latching effect of the catch 68 in the slot 70.

The worm 54 is driven in a clockwise direction when viewed in Fig. 4 so that as the dog 92 engages in a tooth space on the worm 54 the worm will be cammed to the left from the position of Fig. 2 to the position of Fig. 5, so that the core 59 of the flexible drive cable 61 will be moved to the right, as viewed in Fig. 2, to disengage the element 63 from the element 57. As the element 63 is disengaged from the element 57, the core 59 and the worm 54 will cease rotation. Therefore, when the engine 86 is subsequently started and the element 57 is again rotated, it remains ineffective to drive the core 59, and worm 54. The worm wheel 52 will be held by the slot 58 and the blades 1 will remain in a parked position.

When it is desired to again use the wiper blades, the control knob 88 is rotated in a counterclockwise direction, as viewed in Fig. 1, whereby the ports 80 and 82 are brought into communication and the open port 94 of the valve 76 is brought into communication with the port 78. With the valve 76 in this position, subatmospheric pressure is provided from the engine manifold 86 through the conduit 84, the port 80, the port 82, the conduit 72 to the piston chamber 60 whereby the lowered pressure in the chamber 60 causes the piston 62 to move outwardly against the force of the spring 64 so that the catch 68 is moved out of holding engagement with the slot 70. At the same time, atmospheric pressure is admitted through the ports 94 and 78 and the conduit 44 to the pressure chamber 46 whereby the spring 48 is operable to move the piston 40 and the shaft 34 upwardly. As the shaft 34 moves, the dog 92 is moved out of camming engagement with the worm 54 allowing the worm 54, core 59 and element 63 to move under the force of the spring 65 to the left from the position shown in Fig. 5 to the position shown in Fig. 2 whereby the element 57 is again effective to drive the worm 54. The dog 92 is positioned on the shaft 34 to disengage from the worm 54 sufficiently ahead of re-engagement of the worm wheel 52 with the worm 54 to permit the spring 65 to move the element 63 into a light engagement with the element 57 at which time the worm 54 will be substantially in the position shown in Fig. 2. At substantially the time the spring 65 brings the element 63 into a firm enough engagement with the element 57 to cause rotation of the core 59 and worm 54, the worm wheel 52 is engaged with the worm 54 so that the engaging teeth will mesh smoothly. Subsequently, the spring 65 will cause the element 63 to tightly engage the element 57 for driving worm 54, worm wheel 52 and shaft 13 for reciprocating the blades 1.

It will now be obvious that there is disclosed a mechanism whereby windshield wiper blades 1 may be driven from a rotatable source of power such as the engine of an automotive vehicle and whereby by the mere operation of a simple control mechanism the blades may be made to operate for cleaning the vehicle windshield or may easily be parked in a predetermined desired parked position. The blades will remain in this predetermined desired parked position irrespective of stopping and starting of the vehicle engine until such time as it is desired to operate the control mechanism for placing the blades in operation.

What is claimed and is desired to be secured by United States Letters Patent is as follows:

1. In a windshield wiping mechanism, a lever pivoted for oscillatory movement about a fixed pivot and adapted to carry a windshield wiper blade, a crank arm, a fixed-length link connecting said arm to said lever, a shaft for rotating said arm and having a first and a second position, means for rotating said shaft when in said first position, said rotating means being ineffective to rotate said shaft when said shaft is in said second position, releasable means for holding said shaft in said second position, and means for moving said shaft from said second to said first position.

2. In a windshield wiping mechanism, a lever pivoted for oscillatory movement about a fixed pivot and adapted to carry a windshield wiper blade, a crank arm, a fixed-length link connecting said arm to said lever, a shaft for rotating said arm and having a first and a second position, means for rotating said shaft when in said first position, said rotating means being ineffective to rotate said shaft when said shaft is in said second position, releasable means for holding said shaft in said second position, means for moving said shaft from said second to said first position, and means operable to prevent movement of said shaft from said first to said second position except at one rotative position of said shaft.

3. In a windshield wiping mechanism, a lever pivoted for oscillatory movement about a fixed pivot and adapted to carry a windshield wiper blade, a crank arm, a fixed-length link connecting said arm to said lever, a shaft for rotating said arm, and having a first and a second position, means for rotating said shaft when in said first position, said rotating means being ineffective to rotate said shaft when said shaft is in said second position, and co-operating stops operable to prevent movement of said shaft from said first to said second position except at one rotative position of said shaft.

4. In a windshield wiping mechanism, a pair of levers, each of said levers being pivoted for oscillatory movement about a fixed pivot and adapted to carry a windshield wiper blade, a pair of crank arms located between said pivots, a fixed-length link connecting respective ones of said arms to respective ones of said levers, a shaft for rotating said arms and having a first and a second position, means for rotating said shaft when in said first position, said rotating means being ineffective to rotate said shaft when said shaft is in said second position, and co-operating stops operable to prevent movement of said shaft from said first to said second position except when said lever is at one limit of its oscillatory movement.

5. The combination of claim 4 in which said positions lie in a plane extending normally to the line of centers of said pivots and substantially midway therebetween.

6. In a windshield wiping mechanism, a housing, a first element adapted to be driven from a source of rotating power, a member journaled in said housing and bodily movable between a first and a second position, a rotatable shaft carried by said member, a second element carried by said rotatable shaft and operable to be rotated by said first element, means normally maintaining said member in said first position whereby said first element is effective to drive said second element, means for moving said member to said second position whereby said first element is ineffective to drive said second element, and co-operating stops for preventing said member from moving into said second position except at a predetermined rotative position of said shaft.

7. The combination of claim 6 in which said co-operating stops include a pair of cam members.

8. The combination of claim 6 in which said co-operating stops include a pair of cam members and in which one of said cam members is carried by said shaft and the other of said cam members is carried by said housing.

9. The combination of claim 6 in which said co-operating stops include a pair of cam members one of which is carried by said shaft and the other of which is carried by said housing, and in which said one cam member comprises a rotatable disc having a slot and said other cam member is movable into said slot.

10. The combination of claim 6 in which means is provided for releasably holding said member in said second position.

11. In a windshield wiping mechanism, a housing, a worm journaled in said housing and adapted to be driven from a source of rotating power, a member carried by said housing and bodily movable between a first and a second position, a rotatable shaft carried by said member, a worm gear carried by said rotatable shaft, means normally maintaining said member in said first position in which said worm gear is engaged with said worm whereby said worm gear is driven from said source of rotating power, means for moving said member to said second position whereby said worm gear is disengaged from said worm, and means for releasably holding said member in said first position.

12. The combination of claim 11 in which said last-named means is effective to release said member solely at one rotative position of said rotatable shaft.

13. The combination of claim 11 in which said last named means is effective to release said member solely at one rotative position of said rotatable shaft and in which means is provided for releasably holding said member in said second position.

14. The combination of claim 11 in which said last named means is effective to release said member solely at one rotative position of said rotatable shaft and in which means is provided for releasably holding said member in said second position and in which means is also provided for substantially concurrently releasing said last-named releasable holding means and moving said member to said first position.

15. The combination of claim 11 in which said releasable holding means comprises a pair of cam members.

16. The combination of claim 15 in which one of said cam members is a circular member carried by said shaft with a peripheral aperture and the other of said cam members is a fixedly positioned member normally engageable with the peripheral surface of said circular member for maintaining said bodily movable member in said first position but receivable in said aperture for permitting movement of said bodily movable member to said second position.

17. In a windshield wiping mechanism, a housing, a worm journaled in said housing for rotational and longitudinal movement, clutch means cooperable with said worm and adapted to couple said worm to a source of rotating power when said worm is in one longitudinal position and adapted to uncouple said worm from the source when said worm is in a second longitudinal position, a member carried by said housing and bodily movable between a first and a second position, a rotatable shaft carried by said member, a worm gear carried by said rotatable shaft, said member when in said first position being operable to place said worm gear in engagement with said worm and when in its said second position to place said worm gear out of engagement with said worm, means operable to move said member into said member second position whereby said worm gear is disengaged from said worm, and a dog carried by said member and engageable with the teeth of said worm upon movement of said member to said member second position whereby the rotational movement of said worm will move said worm from its said one to its said second position.

18. The combination of claim 17 in which means is provided for moving said member from its said first position to its said second position, and said dog is so positioned on said member that it is disengaged from said worm prior to engagement of said worm wheel with said worm upon movement of said member toward its said first position.

19. In a windshield wiping mechanism, a lever pivoted for oscillatory movement about a fixed pivot and adapted to carry a windshield wiper blade, a crank arm, a fixed-length link connecting said arm to said lever, a shaft for rotating said arm and having a first and a second position, means for rotating said shaft when in said first position, means for rendering said last named means ineffective to rotate said shaft when said shaft is in said second position, said means for rotating said shaft including a worm gear operatively connected to the shaft, a worm adapted to drive the gear, and means, including a clutch, for driving the worm, said means for rendering said means for rotating said shaft ineffective to rotate said shaft including means movable with said shaft when the latter is moved from said first position to said second position to engage said worm whereby continued rotation of said worm causes said worm to move longitudinally, means responsive to such longitudinal movement of said worm for disengaging said clutch, releasable means for holding said shaft in said second position, and means for moving said shaft from said second to said first position.

20. A power transmitting means comprising a driven shaft, a worm gear operatively connected to said shaft, a worm adapted to drive said gear and mounted for rotary and longitudinal movement, means for supporting said gear in meshing relation with said worm, means, including a clutch, for driving said worm, means for moving said gear into and out of said meshing relation with said worm, means for rendering said means for driving said worm ineffective to rotate the latter, said last-named means including means movable into engagement with said worm in response to movement of said gear out of engagement with said worm whereby continued rotation of said worm after engagement with said last named means causes said worm to move longitudinally, and means responsive to said longitudinal movement of said worm for disengaging said clutch.

21. A power transmitting means comprising a driven shaft, a worm gear operatively connected to said shaft, a worm adapted to drive said gear and mounted for rotary and longitudinal movement, means for supporting said gear in meshing relation with said worm, means, including a clutch, for driving said worm, means yieldably holding said clutch engaged, means for rendering said means for driving said worm ineffective to rotate the latter, said last named means including movable into engagement with said worm whereby continued rotation of said worm after such engagement is effective to move said worm longitudinally, and means responsive to said longitudinal movement of said worm for disengaging said clutch.

22. A power transmission mechanism comprising a housing, a worm journaled in said housing for rotational and longitudinal movement, clutch means cooperable with said worm and adapted to couple said worm to a source of rotating power when said worm is in one longitudinal position and adapted to uncouple said worm from the source when said worm is in a second longitudinal position, a worm gear adapted to be driven by said worm, a member carried by said housing and bodily movable between a first position and a second position, a dog carried by said member and engageable with the teeth of said worm upon movement of said member to its said second position whereby continued rotation of said worm will cause said worm to move from its said one longitudinal position to its said second longitudinal position.

23. The combination of claim 22 in which means is provided for resiliently urging said worm toward said one longitudinal position.

24. In a windshield wiping mechanism, a housing, a worm journaled in said housing and adapted to be driven from a source of rotating power, a member carried by said housing and bodily movable between a first and a second position, a rotatable shaft carried by said member, a worm gear carried by said rotatable shaft, means normally maintaining said member in said first position in which said worm gear is engaged with said worm whereby said worm gear is driven from said source of rotating power, means for moving said member to said second position whereby said worm gear is disengaged from said worm, and means for releasably holding said member in said second position.

EMIL E. SIVACEK.

REFERENCES CITED

The following references are of record in the file of this patent:

UNITED STATES PATENTS

| Number | Name | Date |
| --- | --- | --- |
| 1,906,047 | Crutchfield et al. | Apr. 25, 1933 |
| 2,079,573 | Lauer | May 4, 1937 |

FOREIGN PATENTS

| Number | Country | Date |
| --- | --- | --- |
| 461,255 | Great Britain | Feb. 15, 1937 |

Certificate of Correction

Patent No. 2,538,432 January 16, 1951

EMIL E. SIVACEK

It is hereby certified that error appears in the printed specification of the above numbered patent requiring correction as follows:

Column 3, line 2, for the word "form" read *worm*; column 8, line 73, before "movable" insert *means*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*